United States Patent
Zhao et al.

(10) Patent No.: US 9,925,532 B2
(45) Date of Patent: Mar. 27, 2018

(54) METHOD OF PROCESSING HEAVY OILS AND RESIDUA

(71) Applicant: Well Resources Inc., Edmonton (CA)

(72) Inventors: Suoqi Zhao, Beijing (CN); Qiang Wei, Beijing (CN); Chunming Xu, Beijing (CN); Zhiming Xu, Beijing (CN); Xuewen Sun, Beijing (CN); Keng H. Chung, Edmonton (CA)

(73) Assignee: WELL RESOURCES INC., Edmonton (CA)

( * ) Notice: Subject to any disclaimer, the term of this patent is extended or adjusted under 35 U.S.C. 154(b) by 0 days.

(21) Appl. No.: 15/054,959

(22) Filed: Feb. 26, 2016

(65) Prior Publication Data

US 2016/0348012 A1 Dec. 1, 2016

(30) Foreign Application Priority Data

May 29, 2015 (CN) .......................... 2015 1 0290167
Feb. 5, 2016 (CA) ..................................... 2920054

(51) Int. Cl.
| | |
|---|---|
| *B01J 35/10* | (2006.01) |
| *C10G 47/34* | (2006.01) |
| *C10G 67/04* | (2006.01) |
| *C10G 21/00* | (2006.01) |

(52) U.S. Cl.
CPC ............ *B01J 35/10* (2013.01); *C10G 21/003* (2013.01); *C10G 47/34* (2013.01); *C10G 67/049* (2013.01); *C10G 2300/1077* (2013.01); *C10G 2300/206* (2013.01)

(58) Field of Classification Search
CPC .............. C10G 67/0463; C10G 67/049; C10G 2300/202; C10G 2300/206
See application file for complete search history.

(56) References Cited

U.S. PATENT DOCUMENTS

| | | | |
|---|---|---|---|
| 6,270,654 B1 * | 8/2001 | Colyar .................. | C10G 65/10 208/108 |
| 7,597,794 B2 | 10/2009 | Zhao et al. | |
| 2008/0223754 A1 * | 9/2008 | Subramanian ..... | C10G 67/0454 208/86 |
| 2009/0057195 A1 * | 3/2009 | Powers ................ | C10G 21/003 208/59 |
| 2014/0221709 A1 * | 8/2014 | Baldassari ............. | C10G 47/26 585/251 |

\* cited by examiner

*Primary Examiner* — Randy Boyer
(74) *Attorney, Agent, or Firm* — Boyle Fredrickson S.C.

(57) ABSTRACT

There is provided a process of treating a heavy hydrocarbon-comprising material, comprising: contacting a feed material with at least a catalyst material within a contacting zone to effect generation of a total product such that a contacting zone material is disposed within the contacting zone and consists of the catalyst material and a feed/product-comprising mixture comprising the feed material and the total product, wherein the feed/product-comprising mixture includes a Conradson carbon residue content of at least 12 weight percent, based on the total weight of the feed/product-comprising mixture, and also includes an asphaltene content of less than two (2) weight percent, based on the total weight of the feed/product-comprising mixture, and wherein the feed material includes deasphalted heavy hydrocarbon-comprising material. A heavy hydrocarbon-containing feed for a catalytic hydroprocessing or catalytic hydrocracking process is also provided, wherein the feed comprises a deasphalted heavy hydrocarbon-comprising material having a Conradson carbon residue, CCR, content greater than about 12 wt % and an asphaltene content less than about 2 wt %. The feed results in reduced catalyst deactivation or catalyst coking during the catalytic hydroprocessing or catalytic hydrocracking process.

20 Claims, 5 Drawing Sheets

METHOD OF PROCESSING HEAVY OILS AND RESIDUA

CROSS REFERENCE TO PRIOR APPLICATIONS

The present applications claims priority under the Paris Convention to Chinese Patent Application number 201510290167.0, filed May 29, 2015 and to the corresponding Canadian Patent Application number 2,920,054, filed Feb. 5, 2016. The entire contents of such prior applications are incorporated herein by reference.

FIELD

The present disclosure relates to the processing of heavy hydrocarbons.

BACKGROUND

In conventional refineries, fluid catalytic cracking (FCC) is the key process used to convert heavy distillates (vacuum gas oil) into transportation fuels such as gasoline, jet fuel, and diesel. Packed bed hydrotreating and hydroprocessing units are used for removing contaminants and enhancing the feedstock processability prior to further processing. For the past 30 years, tremendous advances have been achieved in FCC and packed bed hydrotreating/hydroprocessing technologies. Some of the improvements to these catalytic refinery processes have been made to their ability to process heavier feedstock, which typically comprises a blend of distillates and certain amount of residua. Currently, many modern refineries are equipped with resid fluid catalytic cracking (RFCC) units and packed bed resid hydroprocessing units to process and convert low-value heavy feedstock into transportation fuels. However, these catalytic processes require stringent feedstock quality specifications to prevent rapid catalyst deactivation and plugging of the catalyst-comprising packed bed. In particular, it has been generally believed that feedstocks with excessive Conradson Carbon Residue (CCR), and/or excessive total metals, would be unsuitable for processing through catalyst material-comprising packed beds. Zuo [Zuo, L., Technology-Economics in Petrochemical, Sinopec Technology and Economic Information Center, 2000, 16(1), 16-21] and Motaghi et al. [Motaghi, M., Subramanian, A. and Ulrich, B., Hydrocarbon Processing, Feb. 1, 2011, p. 37-43] suggest that, for RFCC, CCR content should not exceed eight (8) weight percent, based on the total weight of the feedstock, and 20 units of weight of total metals per million units of weight of feedstock. Dai et al. [Dai, L., Hu, Y. and Li, J., Petroleum Processing and Petrochemicals, 2000, 31(12), 13-16] and Threlkel et al. [Threlkel, R., Dillon, C., Singh, U. G. and Ziebarth, M. S., Proceedings of Japan Petroleum Institute International Symposium, Nov. 5-7, 2008] suggest that, for packed bed resid hydroprocessing, CCR content should not exceed 12 weight percent, based on the total weight of feedstock, and 100 units of weight of total metals per million units of weight of feedstock.

In this respect, it is generally believed that feedstocks with excessive CCR content, or excessive total metals content, are unsuitable for processing through catalytic material-comprising packed beds [Motaghi, M., Subramanian, A. and Ulrich, B., Hydrocarbon Processing, Feb. 1, 2011, p. 37-43]. Even after subjecting such feedstock to deasphalting, the resultant deasphalted heavy hydrocarbon-comprising material may still be unsuitable for processing through catalytic material-comprising packed beds, and often requires blending with light crude or a lighter hydrocarbon fraction so as to sufficiently dilute the undesirable contaminants to satisfactory concentrations for such processing [de Haan, D. Street, M. and Orzeszko, G., Hydrocarbon Processing, Feb. 1, 2013, p. 41-44].

SUMMARY

In one aspect, there is provided a process of treating a heavy hydrocarbon-comprising material, comprising: contacting a feed material with at least one catalyst material within a contacting zone to effect generation of a total product such that a contacting zone material is disposed within the contacting zone and consists of the catalyst material and a feed/product-comprising mixture comprising the feed material and the total product, wherein the feed/product-comprising mixture includes a CCR content of at least 12 weight percent, based on the total weight of the feed/product-comprising mixture, and also includes an asphaltene content of less than two (2) weight percent, based on the total weight of the feed/product-comprising mixture, and wherein the feed material includes deasphalted heavy hydrocarbon-comprising material.

In another aspect, there is provided a process of treating a heavy hydrocarbon-comprising material, comprising: contacting a feed material with at least a catalyst material within a contacting zone to effect generation of a total product such that a contacting zone material is disposed within the contacting zone and consists of the catalyst material and a feed comprising deasphalting a heavy hydrocarbon-comprising material to generate the deasphalted heavy hydrocarbon-comprising material, wherein the feed includes a Conradson carbon residue (CCR) content of at least 12 weight percent, based on the total weight of the feed, and also includes an asphaltene content of less than two (2) weight percent, based on the total weight of the feed.

One or more of the following advantages may be realized when practicing the disclosed processes.

Heavy crudes and residua can be treated by using conventional refinery processes (such as packed bed resid hydroprocessing or resid fluid catalytic cracking, RFCC) without the use of expensive and energy intensive upgrading processes, resulting in significant reduction in capital and operating costs of processing heavy crudes and residual. There are two conventional heavy crude and resid upgrading process flow sheet options that are generally available to the refiners. The first one is to use either coking or ebullated bed hydroprocessing to upgrade the high CCR and/or metals content feedstocks. The alternative is to subject the high CCR and/or metals content feedstock to solvent deasphalting to produce a lower CCR and/or metals content deasphalted oil (DAO) which is diluted with a refinery intermediate stream such vacuum gas oil. The DAO and vacuum gas oil mixture is further processed in the refinery processes [de Haan, D. Street, M. and Orzeszko, G., Hydrocarbon Processing, Feb. 1, 2013, p. 41-44]. However, either coking or ebullated bed hydroprocessing is still required to process the bottoms stream from the solvent deasphalting unit. In any case, the current commercial resid upgrading requires capital costs of at least US$10,000-50,000 per barrel of feedstock and operating costs of at least US$10-15 per barrel of feedstock. In contrast, the presently disclosed processes require capital costs of about US$1,500-2,000 per barrel of feedstock and operating costs of about US$1.00-1.50 per barrel of feedstock.

The heavy hydrocarbon-comprising material feed, of the presently disclosed processes, that is derived from deasphalting operations, require less intensive hydrogen addition, versus coking-derived (thermally cracked) liquid products, and, therefore, provides a benefit of a significant reduction in hydrogen uptake per barrel and lower catalyst deactivation rate. It is generally known that the coking derived (thermally cracked) liquid products are highly hydrogen deficient and require at least 1,200-1,600 standard cubic feet of hydrogen to hydrotreat a barrel of coker product. On the other hand, the heavy hydrocarbon-comprising material feed, of the presently disclosed processes, may only require about 800 standard cubic feet of hydrogen to hydrotreat a barrel of such heavy hydrocarbon-comprising material. In ebullated bed hydroprocessing, the hydroprocessing catalysts are deactivated quickly by high CCR and/or metals content feedstocks. On the other hand, the heavy hydrocarbon-comprising material feed resulting from the presently disclosed processes, would not deactivate hydroprocessing catalysts to the same extent.

Carbon dioxide ($CO_2$) emissions per barrel may be reduced by as much as 40 percent compared to conventional heavy crude upgrading operations, when using the heavy hydrocarbon-comprising material feed of the presently disclosed processes. In most heavy crude upgraders, steam-methane reforming is used to produce the required hydrogen and by-product $CO_2$. Since the disclosed processes require at least 40 percent less hydrogen (to effect hydrotreating of the heavy hydrocarbon-comprising material feed, of the presently disclosed processes) versus the coker-based upgrading operation, the $CO_2$ emissions will be 40 percent less.

The heavy hydrocarbon-comprising material feed, of the presently disclosed processes, has high density and superior feedstock characteristics, resulting in high yield of good quality refined finishing products. High density feedstocks generally contain large hydrocarbon molecules. Compared to a small hydrocarbon molecule, a large hydrocarbon molecule produces a relatively high liquid yield and low gas yield when it is subjected to catalytic cracking with and without the presence of hydrogen. Also compared to a highly hydrogen deficient and aromatic coker products, the products derived from the disclosed processes are virgin feedstock which have good characteristics for catalytic cracking and produces high quality refined finishing products.

Use of the heavy hydrocarbon-comprising material feed, of the presently disclosed processes, effects a significant reduction in refinery by-products and overall hydrocarbon losses. For example, in the coking process, the oilsands bitumen which contains 14 weight percent CCR and 16 weight percent asphaltenes, produces 20 weight percent by-product coke and 10 weight percent of by-product gases. In contrast, the disclosed processes produce 16 weight percent by-product asphaltenes. This is believed to be related to the fact that the disclosed processes are physical separation processes, capable of selective removal of asphaltenes from oilsands bitumen, whereas coking is a high severity thermal cracking reaction process.

In another aspect, there is provided a heavy hydrocarbon-containing feed for a catalytic hydroprocessing or catalytic hydrocracking process, the feed comprising a deasphalted heavy hydrocarbon-comprising material having a Conradson carbon residue, CCR, content greater than about 12 wt % and an asphaltene content less than about 2 wt %.

BRIEF DESCRIPTION OF DRAWINGS

The processes of the description will now be discussed with reference to the following accompanying drawings.

DETAILED DESCRIPTION

The present invention is based on the results of an experimental program to determine the chemistry of asphaltenes in deasphalted oil (DAO) samples obtained from the selective asphaltene separation process described in U.S. Pat. No. 7,597,794 (the entire contents of which are incorporated herein by reference) under various operating conditions, specifically the distribution of basic nitrogen compounds of asphaltenes. The findings from this program are discussed below.

Figure 6:
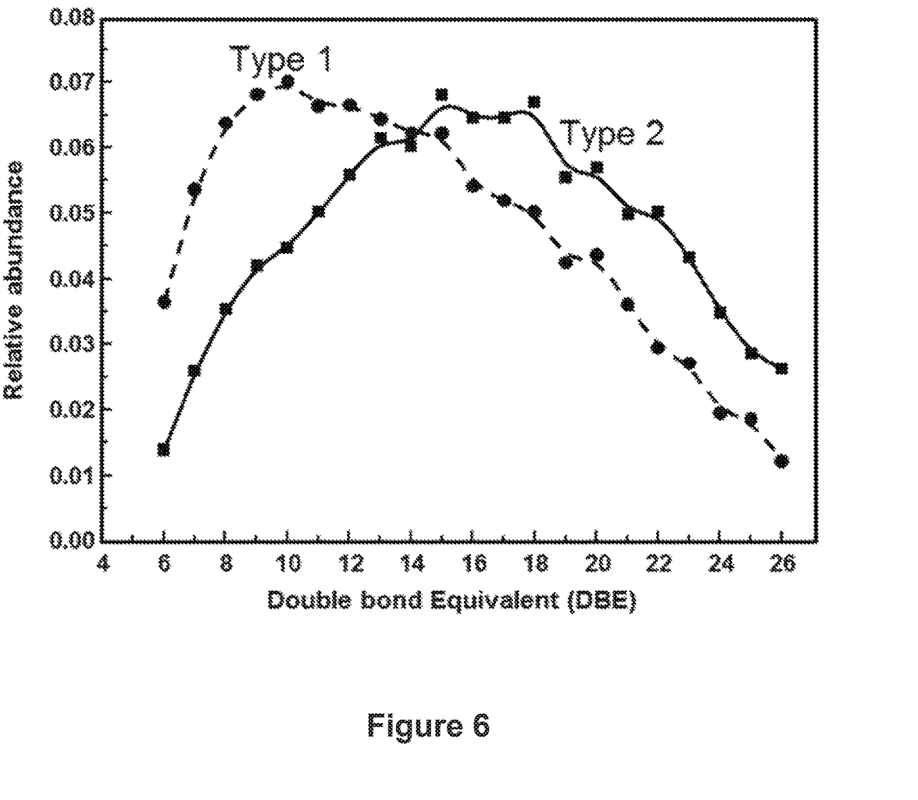
FIG. 6 illustrates the Fourier transform ion cyclotron resonance mass spectrometry analysis of deasphalted oil (DAO) showing relative abundance (y-axis) and number of double bond equivalents (DBEs), which correlates to the number of aromatic rings.

When the DAO asphaltenes derived from various vacuum residua (see Table 1) were subjected to Fourier Transform Ion Cyclotron Resonance Mass Spectrometry (FT-ICR MS) analysis (see FIG. 6), it was found that for DAO with a low asphaltenes content (i.e. up to 2 wt %), the distributions of basic nitrogen compounds of asphaltenes were Type 1. In contrast, for DAO with a high asphaltenes content (i.e. greater than 2 wt %), the distributions of basic nitrogen compounds of asphaltenes were Type 2, indicating relatively more highly condensed nitrogen compounds. In summary, the chemistry of DAO asphaltenes is dependent on the DAO asphaltenes content, which is likely due to selective extraction of asphaltenes sub-fractions.

As known in the art, highly condensed nitrogen compounds are detrimental to catalytic refining processes, causing rapid catalyst deactivation and catalyst coking. For this reason, the DAO samples with various asphaltenes contents, as listed in Table 1, were subjected to catalytic hydroprocessing screening tests. Specifically, the DAO samples were mixed with hydrogen gas at 9 MPa and the mixture was introduced to a 125 mL continuous catalyst testing unit at 390° C. and 0.5 $h^{-1}$ liquid hourly space velocity (LHSV). The testing unit was packed with five types of catalysts, namely hydrodemetallization, hydrodesulfurization, hydrodenitrogenation, CCR removal, and hydrocracking catalysts, in a grading bed configuration. The pressure drop across the packed catalyst bed reactor was monitored. The results in Table 1 showed that the DAO with less than 2 wt % asphaltenes had a constant differential pressure across the catalyst bed after 18 h of continuous run, indicating no catalyst coking or plugging. For DAO with higher than 2 wt % asphaltenes, a 50 kPa differential pressure increase across the catalyst bed after 7 h of continuous run, indicating catalyst coking or plugging. In an extreme case of DAO with 8.5 wt % asphaltenes, the catalyst reactor was plugged after 2 h of operation. This showed that DAO with higher that 2 wt % asphaltenes was not a suitable feed for packed hydroprocessing processes.

TABLE 1

| Type of vacuum resid | DAO asphaltenes content, wt % | DAO CCR content, wt % | Type of nitrogen compounds | Remarks |
|---|---|---|---|---|
| Athabasca | Traces amount | 13.0 | 1 | No pressure drop after 18 h |
| Athabasca | 1.5 | 13.7 | 1 | No pressure drop after 18 h |
| Athabasca | 3.2 | 14.8 | 2 | 50 kPa pressure drop after 8 h |
| Athabasca | 8.5 | 16.5 | 2 | Catalyst bed plugging after 2 h |
| Venezuela | Traces amount | 13.5 | 1 | No pressure drop after 18 h |
| Venezuela | 1.8 | 13.9 | 1 | No pressure drop after 18 h |
| Venezuela | 4.1 | 14.6 | 2 | 50 kPa pressure drop after 7 h |
| Refinery bottoms | Traces amount | 13.1 | 1 | No pressure drop after 18 h |
| Refinery bottoms | 1.3 | 13.5 | 1 | No pressure drop after 18 h |
| Refinery bottoms | 1.7 | 13.9 | 1 | No pressure drop after 18 h |

Figure 1:
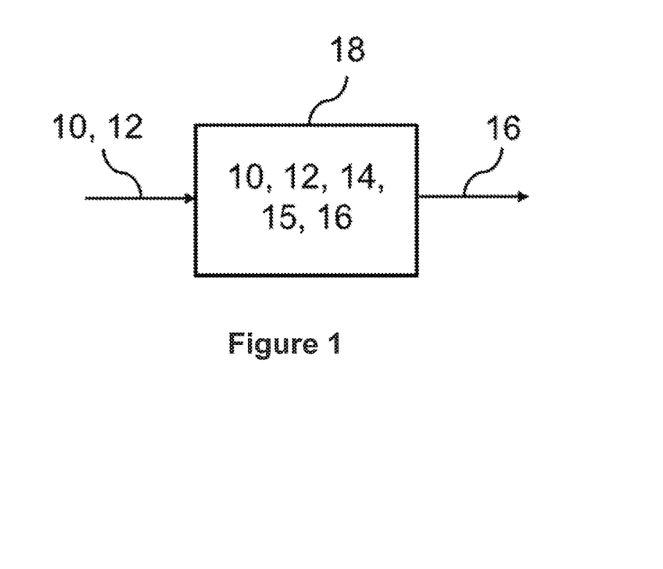
FIG. 1 illustrates a schematic drawing of an aspect of the described process.
Figure 2:
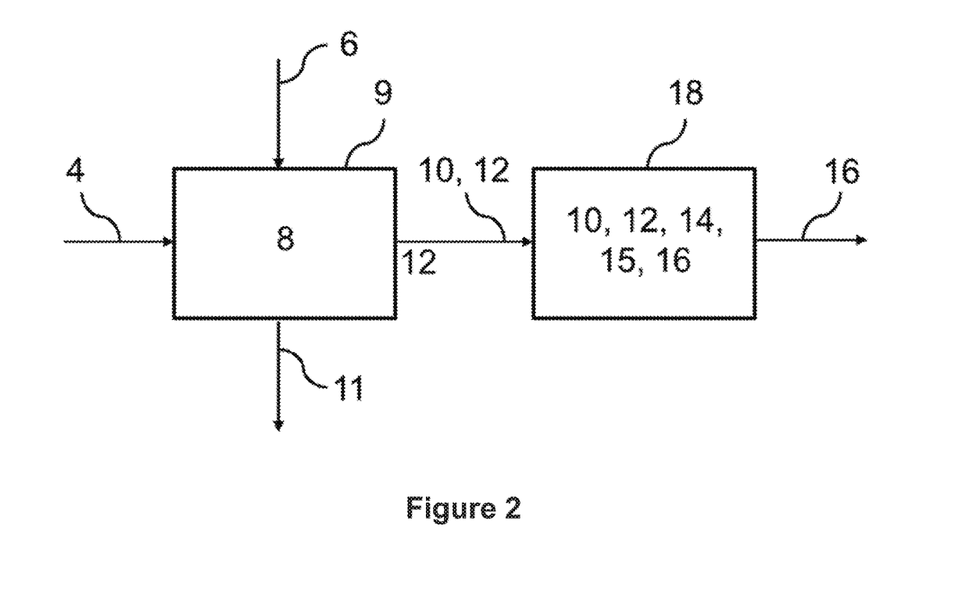
FIG. 2 illustrates a schematic drawing of another aspect of the described process.
Figure 3:
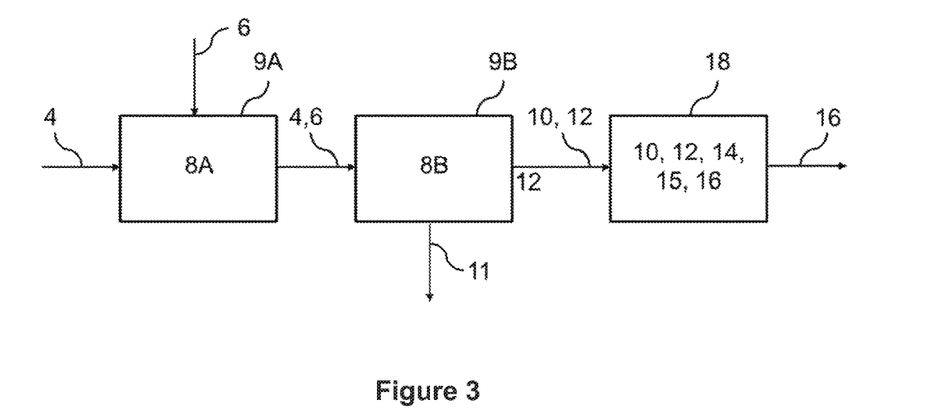
FIG. 3 illustrates a schematic drawing of another aspect of the described process.

Referring to FIGS. 1 to 3, there is provided a process of treating a deasphalted heavy hydrocarbon-comprising material 12.

FIG. 1 illustrates one aspect of the described process, wherein a feed material 10, comprising deasphalted heavy hydrocarbon-comprising material, is routed to a contacting zone, or reaction zone, 14 that comprises a catalyst material 15. The selection of catalyst material 15 would be dependent on the characteristics of feed. In general, the catalyst is one that is suitable for promoting a catalytic reaction for upgrading at least a fraction of the hydrocarbon material contained in the feed material 10, wherein such catalytic reaction occurs within the reaction zone 14. This catalytic upgrading results in the production of a total product material, or upgraded product, 16. Thus, as will be understood, during operation of the process, a reaction zone material is generated within the reaction zone, such reaction zone material consisting of the catalyst material 15 and a feed/product-comprising mixture, wherein the feed/product-comprising mixture comprises the unreacted feed material 10 and the total product material 16. The total product material 16, in turn, comprises the material generated by the upgrading of at least a fraction of hydrocarbon material of the feed material 10.

FIGS. 2 and 3 illustrate another aspect, wherein the process further includes deasphalting a heavy hydrocarbon-comprising material 4 to generate the deasphalted heavy hydrocarbon-comprising material 12.

The heavy-hydrocarbon-comprising material 4 may be liquid, semi-solid, or solid, or any combination thereof.

In some aspects of the described process, the heavy hydrocarbon-comprising material 4 is a material that includes at least 10 weight percent (wt %) of hydrocarbon-comprising material that boils above 500° C. In some aspects the heavy hydrocarbon-comprising material 4 is a material includes at least 20 weight percent of hydrocarbon-comprising material that boils above 500° C. In some aspects the heavy hydrocarbon-comprising material 4 is a material includes at least 30 weight percent of hydrocarbon-comprising material that boils above 500° C. In some aspects the heavy hydrocarbon-comprising material 4 is a material includes at least 40 weight percent of hydrocarbon-comprising material that boils above 500° C. In some aspects the heavy hydrocarbon-comprising material 4 is a material includes at least 50 weight percent of hydrocarbon-comprising material that boils above 500° C. In some aspects the heavy hydrocarbon-comprising material 4 is a material includes at least 60 weight percent of hydrocarbon-comprising material that boils above 500° C. In some aspects the heavy hydrocarbon-comprising material 4 is a material includes at least 70 weight percent of hydrocarbon-comprising material that boils above 500° C. In some aspects the heavy hydrocarbon-comprising material 4 is a material includes at least 75 weight percent of hydrocarbon-comprising material that boils above 500° C. In some aspects the heavy hydrocarbon-comprising material 4 is a material includes at least 80 weight percent of hydrocarbon-comprising material that boils above 500° C. In some aspects the heavy hydrocarbon-comprising material 4 is a material includes at least 90 weight percent of hydrocarbon-comprising material that boils above 500° C. In some aspects the heavy hydrocarbon-comprising material 4 is a material that boils above 500° C.

In some aspects the heavy hydrocarbon-comprising material 4 includes a CCR content of at least 12 weight percent (wt %), based on the total weight of the heavy hydrocarbon-comprising material. In particular, the CCR content of the material 4 is between 12 to 30 wt %. In some aspects the heavy hydrocarbon-comprising material 4 includes a CCR content of at least 13 weight percent (wt %), based on the total weight of the heavy hydrocarbon-comprising material. In some aspects the heavy hydrocarbon-comprising material 4 includes a CCR content of at least 14 weight percent (wt %), based on the total weight of the heavy hydrocarbon-comprising material. In some aspects the heavy hydrocarbon-comprising material 4 includes a CCR content that is less than 30 weight percent (wt %), based on the total weight of the heavy hydrocarbon-comprising material.

In some aspects of the described process, the heavy hydrocarbon-comprising material 4 includes an asphaltene content of less than 40 weight percent, based on the total weight of the heavy hydrocarbon-comprising material. In some of these aspects, the heavy hydrocarbon-comprising material includes an asphaltene content of less than 20 weight percent, based on the total weight of the heavy hydrocarbon-comprising mixture. In some of these aspects, the heavy hydrocarbon-comprising material includes an asphaltene content of less than 15 weight percent, based on the total weight of the heavy hydrocarbon-comprising material.

In some aspects of the described process, the heavy hydrocarbon-comprising material 4 includes an inorganic solids content of less than one (1) weight percent, based on the total weight of the heavy hydrocarbon-comprising material. In some of these aspects, the heavy hydrocarbon-comprising material includes an inorganic solids content of less than 0.5 weight percent, based on the total weight of the heavy hydrocarbon-comprising material.

In some aspects of the described process, the inorganic solids of the heavy hydrocarbon-comprising material 4 may be micrometer ($10^{-6}$ m) sized particles, which can be determined by high temperature filtration technique. In some aspects, the inorganic solids in the heavy hydrocarbon-comprising material 4 may be sub-micron (smaller than $10^{-6}$ m) sized particles, which can be determined by ultra-high speed centrifugation of the diluted heavy hydrocarbon-comprising material 4.

In some aspects of the described process, the heavy hydrocarbon-comprising material 4 has an API (American Petroleum Institute) gravity of less than 20°. In some aspects, the heavy hydrocarbon-comprising material 4 has an API gravity of less than 15°. In some aspects, the heavy hydrocarbon-comprising material 4 has an API gravity of less than 12°. In some aspects, the heavy hydrocarbon-comprising material 4 has an API gravity of less than 10°. In some aspects, the heavy hydrocarbon-comprising material 4 has an API gravity of less than 5°. In some aspects, the heavy hydrocarbon-comprising material 4 has an API gravity of less than 0°. In some aspects, the heavy hydrocarbon-comprising material 4 has an API gravity of less than −2°. In some aspects, the heavy hydrocarbon-comprising material 4 has an API gravity of less than −4°. In some aspects, the heavy hydrocarbon-comprising material 4 has an API gravity of less than −8°. In some aspects, the heavy hydrocarbon-comprising material 4 has an API gravity of less than −10°.

In some aspects of the described process, the heavy hydrocarbon-comprising material 4 includes, or in some aspects, consists of, residuum or resid. Exemplary residua include various heavy crude and refinery fractions as would be known to persons skilled in the art. In this respect, in some aspects, the heavy hydrocarbon-comprising material includes, or in some aspects, consists of, fresh resid hydrocarbon feeds, a bottoms stream from a refinery process, such as petroleum atmospheric tower bottoms, vacuum tower bottoms, or a bottoms stream from a coker or a visbreaker or a thermal cracking unit, or a bottoms stream from a fluid catalytically cracked (FCC) or a RFCC unit, hydrocracked atmospheric tower or vacuum tower bottoms, straight run vacuum gas oil, hydrocracked vacuum gas oil, FCC slurry oils or cycle oils, as well as other similar hydrocarbon-comprising materials, or any combination thereof, each of which may be straight run, process derived, hydrocracked, or otherwise partially treated (desulfurized). The heavy hydrocarbon-comprising material 4 described herein may also include various impurities, such as sulphur, nitrogen, oxygen, halides, and metals.

In some aspects of the described process, the heavy hydrocarbon-comprising material 4 includes, or in some aspects, consists of, a crude, such as a heavy and/or an ultra-heavy crude. Crude refers to hydrocarbon material which has been produced and/or retorted from hydrocarbon-containing formations and which has not yet been distilled and/or fractionally distilled in a treatment facility to produce multiple components with specific boiling range distributions, such as atmospheric distillation methods and/or vacuum distillation methods. Exemplary crudes include coal derived liquids, bitumen, tar sands, or crude oil.

As discussed further herein, and as illustrated in FIGS. 2 and 3, the heavy hydrocarbon material used in the presently described process is preferably first subjected to a deasphalting step. Alternatively, the presently described process includes a deasphalting step. Such deasphalting results in the production of the deasphalted heavy hydrocarbon-comprising material 12. As will be understood by persons skilled in the art, the asphaltene content of the deasphalted heavy hydrocarbon-comprising material 12 would generally be less than the asphaltene content of the heavy hydrocarbon-comprising material 4. As discussed further below, the deasphalting step may involve any known method, such as a solvent extraction process or a reactive process etc. In a preferred aspect, the deasphalting step results in a hydrocarbon material containing up to 2% asphaltenes.

In some aspects of the described process, the step of deasphalting is effected by solvent extraction, as is well known in the art. Examples of such solvent extraction methods are described in, for example, the article by Billon and others published in 1994 in Volume 49, No. 5 of the journal of the French Petroleum Institute, pages 495 to 507, in the book "Raffinage et conversion des produits lourds du petrole [Refining and Conversion of Heavy Petroleum Products]" by J. F. Le Page, S. G. Chatila, and M. Davidson, Edition Technip, pages 17-32. Exemplary solvent extraction processes, for effecting the deasphalting, are also described in U.S. Pat. No. 7,597,794.

In some aspects of the described process, the deasphalting is effected by contacting the heavy hydrocarbon-comprising material 4 with solvent material 6, within a solvent material contacting zone 8 (or 8A), to effect production of a mixture including an asphaltene-depleted heavy hydrocarbon comprising material intermediate 12 and an asphaltene-enriched solvent material intermediate 11.

In some aspects of the described process, the solvent material that is used for the deasphalting is a hydrocarbon material which is a liquid at the operating conditions of the solvent material contacting zone. In some aspects, the solvent material is a relatively light hydrocarbon or a mixture including two or more light hydrocarbons. Exemplary light hydrocarbons include propane, butane, isobutane, pentane, isopentane, hexane, heptane, and corresponding mono-olefinic hydrocarbons, and corresponding cyclic hydrocarbons. In some aspects, the solvent material includes one or more paraffinic hydrocarbons having from 3 to 7 carbon atoms in total per molecule.

In some aspects of the described process, the solvent material used for the deasphalting step is a supercritical fluid at the operating conditions of the solvent material contacting zone 8 or 8A.

In some aspects of the described process, the solvent material is pentane.

The mixture, resulting from the contacting zone, is preferably separated, within a separation zone, as shown at 8 or 8B, into at least the asphaltene-depleted heavy hydrocarbon-comprising material fraction 12 and the asphaltene-enriched solvent material fraction 11. The asphaltene content of the asphaltene-depleted heavy hydrocarbon-comprising fraction 12 is less than the asphaltene content of the heavy hydrocarbon-comprising material 4. As will be understood, other fractions may also be separated during the separation step.

In some aspects of the described process, the above mentioned separation step is effected by gravity separation. In other aspects, the separation is effected by phase separation. In other aspects, the separation is effected by an extraction process. Generally, the asphaltene-enriched solvent material fraction 11, which would have a higher density than the asphaltene-depleted heavy hydrocarbon-comprising material fraction 12, is recovered as a bottoms product, and the asphaltene-depleted heavy hydrocarbon-comprising material fraction 12 is recovered as an overhead product.

Referring to FIG. 2, in one aspect, both the contacting and separation steps are conducted within a combined contactor/separator 9, such as a mixer-decanter or an extraction column. In this respect, the solvent material contacting zone and the separation zone are at least partially co-located within zone 8.

Referring to FIG. 3, in another aspect, the contacting and separation steps are conducted in separate units. For example, as illustrated in FIG. 3, the contacting step is effected within unit 9A, which is preferably a mixer, having a mixing zone 8A. The resulting mixture is then supplied to a separator 9B having a separation zone 8B to effect the separation step. As indicated above, the separation step may comprise a gravity separation.

In some aspects of the described process, the contactor/separator 9 may contain bubble trays, packing elements such as rings or saddles, structured trays, or combinations thereof, to facilitate contacting between the heavy hydrocarbon-comprising material and the solvent material. In other aspects, the contactor/separator may be an empty column without any internals.

In some aspects of the described process, the contactor/separator 9 is operated such that the temperature within the contacting/separation zone 8 is near or above the pseudocritical temperature $T_{pc}$ of the solvent material, and the pressure within the contacting/separation zone 8 is above the pseudocritical pressure $P_{pc}$ of the solvent material.

In some aspects of the described process, the asphaltene-depleted heavy hydrocarbon-comprising material fraction 12 is further separated into at least a solvent-rich fraction, a concentrated asphaltene-depleted lighter oil material fraction and a concentrated asphaltene-depleted heavier hydrocarbon-comprising material fraction. In such case, the concentrated asphaltene-depleted heavier hydrocarbon-comprising material fraction is recovered as the deasphalted heavy hydrocarbon-comprising material 12. As will be understood, other fractions may also be separated. In some of these aspects, the separation is effected by steam stripping, evaporation, distillation, or by a supercritical separation process (i.e., under supercritical conditions). In some of these aspects, solvent material, from the solvent-rich fraction, is recovered for recycle and re-use in the solvent extraction unit operation of the deasphalting step.

As shown in FIGS. 2 and 3, a feed material 10, including the deasphalted heavy hydrocarbon-comprising material 12, is provided in reaction zone 14, in the presence of catalyst material 15, under conditions which effect upgrading of at least a fraction of the hydrocarbon material of the feed material. The catalyst material 15 serves to catalyze the upgrading of the feed material 10.

The catalyst material 15 may be any catalyst that is suitable for increasing the rate of chemical reaction(s) which effect the upgrading of at least a portion of the hydrocarbon material in the feed material 10. Upgrading, in this context, will be understood to mean a process wherein hydrocarbon material of the feed material 10 undergoes at least one of the following changes: reduction in the molecular weight; reduction in the boiling point range; reduction in the concentration of asphaltenes; reduction in the concentration of hydrocarbon free radicals; or a reduction of impurities, such as sulphur, nitrogen, oxygen, halides, and metals.

In some aspects of the described process, the catalyst 15 comprises particulate material in the shape of cylindrical extrudate, trilobes extrudate, or tetralobes extrudate. In some aspects, the extrudate has a diameter of one (1) millimeter to five (5) millimeters and a length of three (3) millimeters to 30 millimeters. In some aspects, the catalyst material 15 for hydrodemetalization is a cylindrical extrudate having a diameter of three (3) millimeters to five (5) millimeters and a length of three (3) millimeters to 10 millimeters. In some aspects, the catalyst material 15 for hydrodesulfurization is a trilobes extrudate having a diameter of 1.5 millimeters to three (3) millimeters and a length of 10 millimeters to 30 millimeters. In some aspects, the catalyst material 15 for hydrodenitrogenation or hydro-CCR removal is a trilobes extrudate having a diameter of one (1) millimeter to two (2) millimeters and a length of 10 millimeters to 30 millimeters.

In some aspects of the described process, the catalyst material 15 has a pore size of 10 to 30 nanometers, such as 15 to 25 nanometers. Also, in some aspects, the catalyst material 15 has a total pore volume of 0.8 to 2 milliliters per gram of catalyst material, such as 1 to 1.5 milliliters per gram of catalyst material. Also, in some aspects, the catalyst material 15 has a specific surface area of 150 to 400 square meters per gram of catalyst material, preferable 200-250 square meters per gram of catalyst material.

In some aspects of the described process, the ratio of volume of catalyst material 15 to volume of feed material 10 within the reaction zone 14 is from 0.5 to 5.0. In some aspects, this ratio is from 1.0 to 2.0.

In some aspects of the described process, the reaction residence time of feed or feed/product-comprising mixture to the catalyst material 15 within the reaction zone 14 is at least 10 minutes. In some of these aspects, the reaction residence time is less than 30 minutes. In some of these aspects, the reaction residence time is less than 60 minutes. In some of these aspects, the reaction residence time is less than 90 minutes. In some of these aspects, the reaction residence time is less than 120 minutes.

In some aspects of the described process, the contacting of the feed with the catalyst is effected while the feed/product-comprising mixture is being flowed through the contacting zone in response to a driving force.

In some aspects of the described process, the catalyst material 15 is suitable for facilitating hydrogen addition that effects the redistribution of hydrogen amongst the various hydrocarbon components of the hydrocarbon material of the feed material, resulting in increased hydrogen/carbon (H/C) atomic ratio of the product material.

In some aspects of the described process, the feed material 10 also includes a hydrogen donor. In this regard, hydrogen donor means hydrogen or a compound which is reactive with other materials of the feed material, within the reaction zone, to produce hydrogen. In some of these aspects, the hydrogen donor includes molecular hydrogen, such as diatomic hydrogen ($H_2$). In some of these aspects, the molecular hydrogen is gaseous.

Where the feed material 10 includes a hydrogen donor, such as molecular hydrogen, contacting of the feed with the catalyst 15 effects an upgrading of the hydrocarbon material of the feed material, and such upgrading is generally known as "hydroprocessing". As known in the art, the term "Hydroprocessing" is used to define as the upgrading, in the presence of hydrogen, of hydrocarbon material of the feed material. Hydroprocessing includes hydroconversion, hydrocracking, hydrogenation, hydrotreating, hydrodesuplhurization, hydrodenitrogenation, hydrodemetallation, hydrodearomatization, hydroisomerization, and hydrodewaxing. As will be understood, the catalyst material 15 used in the presently described process may comprise a combination of different catalysts for facilitating one or more of the above mentioned reactions. For example, the catalyst material 15 may comprise a combination of five catalysts to catalyze, for example, one or more of hydrodemetalization, hydrodesulphurization, hydrodenitrogenation, CCR removal, and/or hydrocracking of the feed material.

In some aspects of the described process, the catalyst material includes a functional catalyst material and a catalyst support material, wherein the functional catalyst material is supported on the catalyst support material. In some aspects, the functional catalyst material comprises 0.1 to 5 weight percent cobalt and 1.2 to 30 weight percent molybdenum. In some aspects, the functional catalyst material comprises 0.1 to 5 weight percent nickel and 1.2 to 30 weight percent molybdenum. In some aspects, the functional catalyst material comprises 0.1 to 5 weight percent nickel and 2 to 40 weight percent tungsten. In some aspects, the catalyst support material comprises 0 to 15 weight percent zeolite, and 0.1 to 5 weight percent phosphorous, and 20 to 90 weight percent gamma-alumina. In some aspects, the catalyst support material comprises 0 to 15 weight percent zeolite, and 0.1 to 5 weight percent phosphorous, and 20 to 90 weight percent alumina-silica. All values of weight percent are based on the total weight of catalyst material.

In some aspects of the described process, in addition to the deasphalted heavy hydrocarbon-comprising material 12, the feed material 10 may additionally include a dilution agent for effecting dilution of the deasphalted heavy hydrocarbon-comprising material 12 prior to the step of contacting the material with the catalyst material 15. As would be known to persons skilled in the art, the step of dilution is preferably effected for mitigating fouling, deactivation, or other degradation of the catalyst material.

In some aspects of the described process, the feed material 10 is deasphalted heavy hydrocarbon-comprising material 12, and the deasphalted heavy hydrocarbon-comprising material 12 is supplied to the reaction zone in undiluted form.

In some aspects, the reaction zone 14 is disposed within a reaction vessel 18 as shown in FIGS. 2 and 3.

The upgrading described above results in the production of a total product material (upgraded product) 16. As illustrated in FIGS. 2 and 3, a reaction zone material is disposed within the reaction zone and consists of the catalyst material 15, a feed/product-comprising mixture comprising the feed material 10 and the total product material 16. The total product material 16 includes the material generated by the upgrading of at least a portion of the hydrocarbon material of the feed material 10.

The feed/product-comprising mixture has a CCR content of at least 12 weight percent, based on the total weight of the feed/product-comprising mixture, and an asphaltene content of less than two (2) weight percent, based on the total weight of the feed/product-comprising mixture. In some aspects, the feed has a CCR content of at least 12 weight percent, based on the total weight of the feed, and an asphaltene content of less than two (2) weight percent, based on the total weight of the feed.

In some aspects of the described process, the CCR content is at least 13 weight percent, based on the total weight of the feed or feed/product-comprising mixture. In some aspects, the CCR content is less than 18 weight percent, based on the total weight of the feed or feed/product-comprising mixture. In some aspects, the CCR content is less than 17 weight percent, based on the total weight of the feed or feed/product-comprising mixture. In some aspects, the CCR content is less than 16 weight percent, based on the total weight of the feed or feed/product-comprising mixture. In some aspects, the CCR content is less than 15 weight percent, based on the total weight of the feed or feed/product-comprising mixture. In some aspects, the CCR content is less than 14 weight percent, based on the total weight of the feed or feed/product-comprising mixture.

In some aspects of the described process, the asphaltene content is negligible. In other words, in such aspects, the feed or feed/product-comprising mixture contains substantially no asphaltenes. In this regard, it will be understood that "substantially no asphaltenes" is intended to mean that the asphaltene content is 0 or substantially close to 0, which will be understood to include some trace amounts of asphaltenes.

CCR content is defined herein as equal to the value as determined by test method ASTM D4530, Standard Test Method for Determination of Carbon Residue (Micro Method).

The asphaltene content of the feed or feed/product-comprising mixture is defined herein by the modified China Petroleum and Petrochemical Industry Standard Test Method SH/T0509-92. In some aspects, the asphaltene content of the feed or feed/product-comprising mixture is defined by ASTM 6560-12, Standard Test Method for Determination of Asphaltenes in Crude Petroleum and Petroleum Products.

Total metals content is defined herein as the sum of nickel content and vanadium content as determined by test method ASTM D5708, Standard Test Methods for Determination of Nickel, Vanadium, and Iron in Crude Oils and Residual Fuels by Inductively Coupled Plasma (ICP) Atomic Emission Spectrometry.

In some aspects of the described process, the feed/product-comprising mixture includes a total metals content of at least 100 unit weight parts per million unit weight parts of feed/product-comprising mixture. In some of these aspects, the feed/product-comprising mixture includes a total metals content of less than 400 unit weight parts per million unit weight parts of feed/product-comprising mixture. In some aspects, the feed includes a total metals content of at least 100 unit weight parts per million unit weight parts of feed. In some of these aspects, the feed includes a total metals content of less than 400 unit weight parts per million unit weight parts of feed.

In some aspects of the described process, the total product 16 is recovered from the reaction zone and discharged from the reaction vessel 18.

Further aspects will now be described in further detail with reference to the following non-limiting examples.

Example 1

Figure 4:
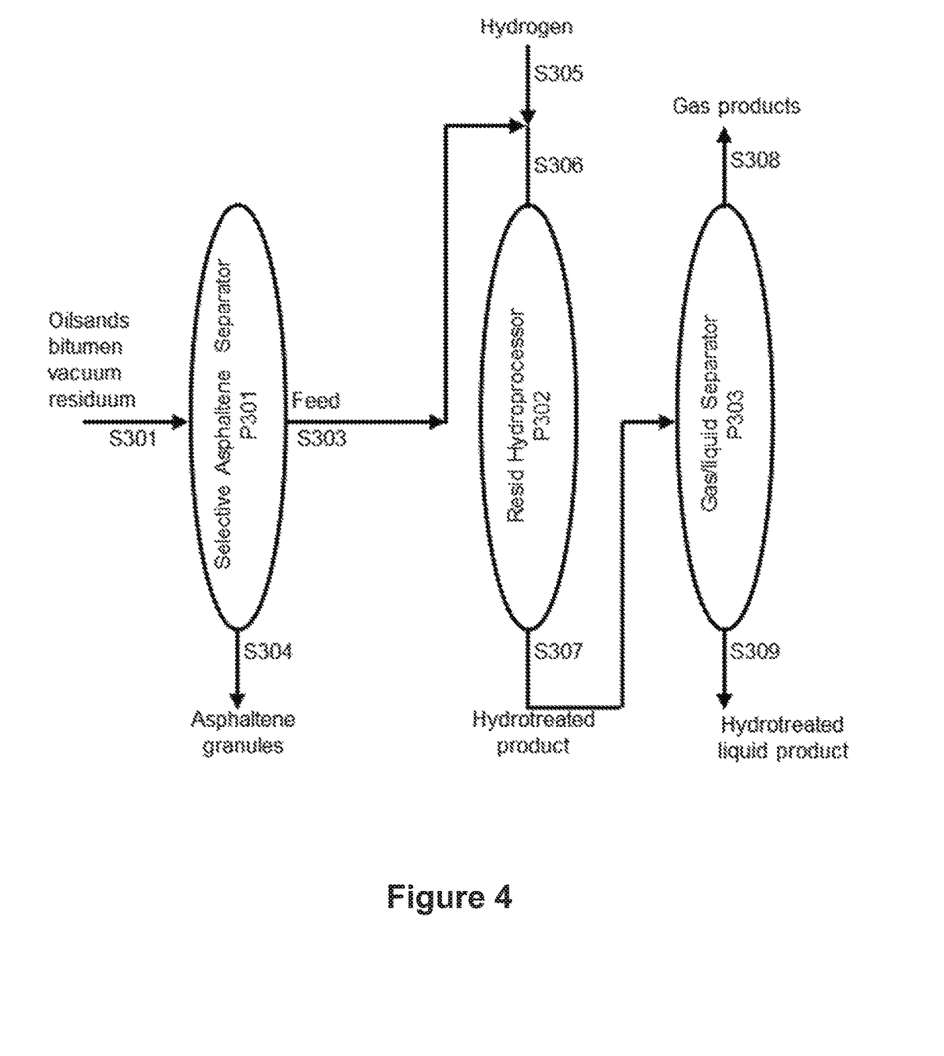
FIG. 4 is a process flow diagram of the process of Example 1.

Athabasca bitumen-derived vacuum residuum was obtained from a commercial mined oilsands plant in Fort McMurray, Alberta. FIG. 4 shows the process scheme of treating the vacuum residuum. The properties of vacuum residuum S301 are shown in Table 2. The high concentrations of metal and CCR data in Table 2 show that the bitumen derived vacuum residuum is a relatively low quality feedstock. Hence, it was selected as a representative feedstock to illustrate an extreme worst case scenario of applying the method of the present description. The common upgrading process used for this type of vacuum residuum is by either coking or ebullated bed hydrocracking.

The vacuum residuum S301 was introduced to a one (1) barrel per day continuous pilot scale selective asphaltene separator P301, which is similar to that described in U.S. Pat. No. 7,597,794. The selective asphaltene separator P301 used n-pentane as solvent and was operated at 160° C., 5 MPa and solvent-to-oil ratio of 4 (on the weight basis). In the selective asphaltene separator P301, the vacuum residuum S301 was separated into two products: feed S303 and asphaltene granules S304. Table 2 shows that the quality of feed S303 was improved, compared to the bitumen vacuum residuum S301. However, the feed S303 still contained 250 ppm metals and 13 weight percent CCR, which exceeds the specified operating guidelines for packed bed resid hydroprocessing (which are 100 ppm metals and 12 weight percent CCR). The unique characteristics of feed S303 was that it was a deep-cut residuum with negligible amount of asphaltenes.

The feed S303 was mixed with hydrogen gas S304 at 9 MPa and the mixture was introduced to a 125 mL continuous catalyst testing reactor unit P302 which was operated at 390° C. and 0.5 $h^{-1}$ liquid hourly space velocity (LHSV). The catalysts testing reactor unit P302 was a commercial apparatus packed with five types of catalysts (a hydrodemetallization catalyst, comprising 0.5 percent nickel and 2.5 percent molybdenum supported on alumina; a hydrodesulfurization catalyst comprising 2.5 percent cobalt and 20 percent molybdenum supported on alumina; a hydrodenitrogenation catalyst comprising 4.0 percent nickel and 25 percent molybdenum supported on the alumina; a CCR removal catalyst comprising 5.0 percent nickel and 30 percent molybdenum was supported on the alumina with; and a hydrocracking catalyst comprising 2.5 percent nickel and 25 percent tungsten supported on 10 percent Y zeolite mixed silica-alumina) in grading bed configuration. Prior to the resid hydroprocessing run of the feed S303, the reactor unit P302 had been fed continuously with a feed, similar to feed S303, and derived from an extra heavy crude, for 1500 hours. As a result, the catalysts, in the reactor unit P302, were disposed at an equilibrium state when it was fed with the feed S303 and hydrogen gas mixture. The continuous packed bed resid hydroprocessing run with the feed S303 was on-stream for 1500 hours. No pressure drop build-up across the catalyst bed was observed for 1500 hours of continuous operation. This is an indication that no catalyst bed plugging was experienced even though the feedstock contained relatively high concentrations of metals (250 ppm) and a relatively high CCR concentration (13 weight percent) without experiencing catalyst bed plugging, leading to pressure drop build-up across the catalyst bed.

The reaction product S307 from the reactor unit P302 was routed to a gas/liquid separator P303 in which the reaction product S307 was separated into gas product S308 and hydrotreated liquid product S309, which were sampled daily for analysis. The data in Table 2 show that properties of the hydrotreated liquid product S309 were dramatically improved after resid hydroprocessing, including the yield of 10 weight percent diesel and 40 weight percent hydrotreated heavy gas oil, determined by simulated distillation. More importantly, the hydrotreated liquid product S309 contained 3 ppm metals, 4 weight percent CCR and 45 weight percent saturated hydrocarbons, which are superior characteristics for catalytic cracking feedstock.

The results of this example illustrate that, surprisingly, poor-quality heavy crude derived residuum can be processed using a conventional packed bed resid hydroprocessing unit for preparing a feedstock that is suitable for other refinery processes.

TABLE 2

Properties of S301, S303 and S309

| | | S301 | S303 | S309 |
|---|---|---|---|---|
| Yield, wt % | IBP-350° C. | 0 | 0 | 10 |
| | 350-524° C. | 0 | 0 | 40 |
| Density @20° C., g/cm³ | | 1.0648 | 0.9990 | 0.9486 |
| Molecular weight | | | | 545 |
| Carbon, wt % | | 82.97 | 82.82 | 86.22 |
| Hydrogen, wt % | | 9.65 | 10.43 | 11.53 |
| H/C (atomic) ratio | | 1.39 | 1.50 | 1.60 |
| Sulfur, wt % | | 6 | 4.8 | 0.59 |

TABLE 2-continued

Properties of S301, S303 and S309

| | S301 | S303 | S309 |
|---|---|---|---|
| Nitrogen, wt % | 0.68 | 0.51 | 0.36 |
| Nickel, ppm | 144 | 77 | 2 |
| Vanadium, ppm | 357 | 176 | 1 |
| Concarbon residue (CCR), wt % | 23.3 | 13 | 4.2 |
| Saturates, wt % | 9.31 | 18.99 | 44.80 |
| Aromatics, wt % | 43.44 | 56.24 | 43.97 |
| Resins, wt % | 21.67 | 24.77 | 11.23 |
| Asphaltenes, wt % | 25.58 | ND* | ND* |

*ND—Not detectable

Example 2

Figure 5:
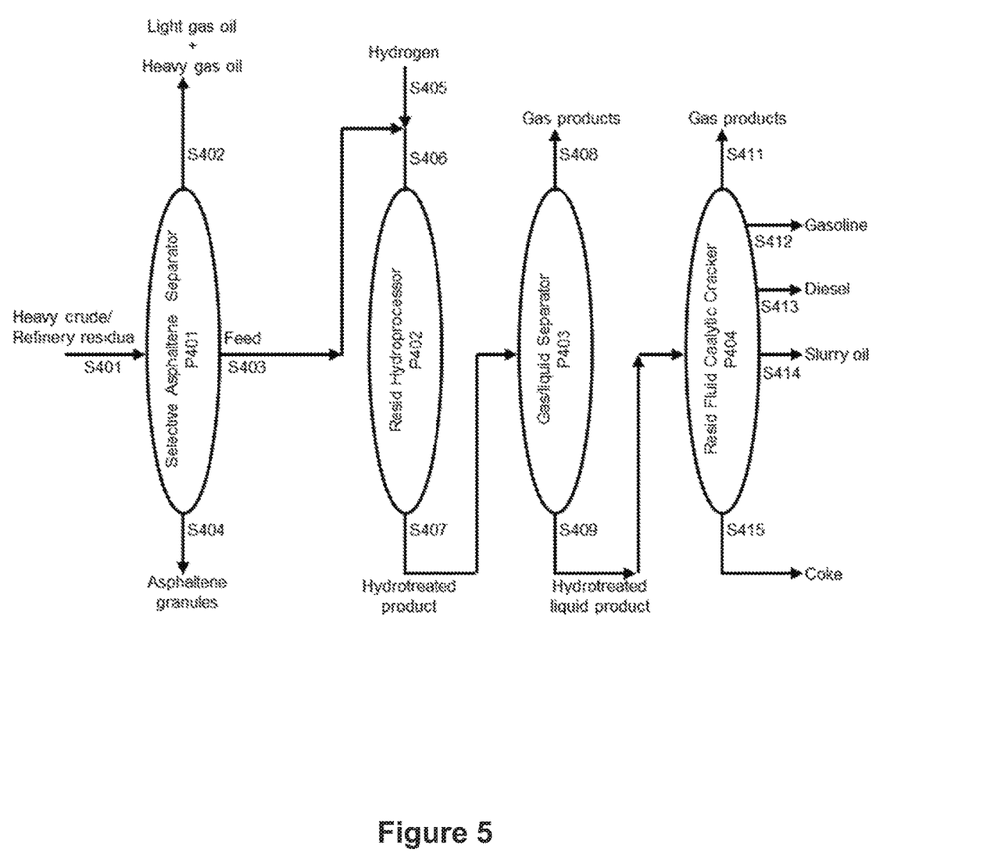
FIG. 5 is a process flow diagram of the process of Example 2.

One of the purposes of a packed bed resid hydroprocessing step is as a feedstock pretreatment for RFCC unit. This example will illustrate that certain heavy hydrocarbon-comprising material can be good feedstock for RFCC unit with low severity resid hydroprocessing. The process of Example 2 is illustrated in FIG. 5.

Feed S403 was obtained from a commercial selective asphaltene separator P401 located at a refinery [Zhao et al., OGJ, Apr. 5, 2010, 52-59]. The selective asphaltene separator P401 was similar to that described in U.S. Pat. No. 7,597,794. The feed to the selective asphaltene separator P401 was a blend of heavy crude and refinery residua. Table 3 shows the properties of the feed S403, including the fact that it contained high concentrations of metals (280 ppm), CCR (13.5 wt %) and 1.3 wt % asphaltenes. The feed S403 contained a high amount saturated hydrocarbons (40 wt %), which is a good feedstock characteristic for RFCC. Also, our analysis indicated that the chemistry of the feed S403 asphaltenes (1.3 wt %) was not the same as those of typical asphaltenes obtained from conventional deasphalting processes. Exemplary chemical characteristics include the distribution of nitrogen containing compounds in the feed S403 asphaltenes is different from that in typical asphaltenes obtained from conventional deasphalting processes. The feed S403 asphaltenes do not cause hydroprocessing catalyst coking and plugging of packed catalyst bed, whereas typical asphaltenes obtained from conventional deasphalting processes cause hydroprocessing catalyst coking and plugging of packed catalyst bed.

The feed S403 was mixed with hydrogen gas S405 at 9 MPa and the mixture was introduced to a 125 mL continuous catalyst testing reactor unit P402 which was operated at 390° C. and 1.0 $h^{-1}$ liquid hourly space velocity (LHSV). The catalysts testing reactor unit P402 was a commercial apparatus packed with five types of catalysts (a hydrodemetallization catalyst, comprising 0.2 percent nickel and 5 percent molybdenum supported on alumina; a hydrodesulfurization catalyst comprising 2.5 percent cobalt and 25 percent molybdenum supported on alumina; a hydrodenitrogenation catalyst comprising 3.0 percent nickel and 20 percent molybdenum supported on the alumina; a CCR removal catalyst comprising 4.0 percent nickel and 25 percent molybdenum was supported on the alumina with; and a hydrocracking catalyst comprising 2.0 percent nickel and 25 percent tungsten supported on 20 percent Y zeolite mixed silica-alumina) in grading bed configuration. Prior to the resid hydroprocessing run of the feed S403, the reactor unit P402 was subjected to pre-sulfiding with 2% carbon disulfide in cyclohexane for 72 hours, followed by pre-coking with Chinese Daqing derived vacuum gas oil for 48 hours.

The continuous packed bed resid hydroprocessing run with the feed S403 was on-stream for 400 hours. No pressure drop build-up across the catalyst bed was observed for 400 hours of continuous operation. Surprisingly, even though the feedstock contained such high concentrations of metals (280 ppm), CCR (13.5 wt %) and 1.3 wt % asphaltenes, no catalyst bed plugging, leading to pressure drop build-up across the catalyst bed, was observed.

The reaction product S407 from the reactor unit P402 was routed to a gas/liquid separator P403 in which the reaction product S407 was separated into gas product S408 and hydrotreated liquid product S409, which were sampled daily for analysis. The data in Table 3 show that properties of hydrotreated liquid product S409 were improved after resid hydroprocessing: 8.5 weight percent CCR and 53 weight percent saturate hydrocarbons. However, the hydrotreated liquid product S409 had a relatively high density (0.934 g/cm$^3$) and relatively high metals concentration (53 ppm), and these values were higher than those prescribed by typical threshold RFCC feedstock specifications. It is generally believed that high density feedstock may cause fluidization instability in a FCC riser reactor, due to interaction of catalyst particles and hydrocarbons, which result in catalyst particle agglomeration. Typically, RFCC feedstock consists of a blend of vacuum residuum and vacuum gas oil.

The hydrotreated liquid product S409 was subjected to RFCC test in a 1.5 kg/h continuous modified ARCO type FCC pilot testing unit P404. The continuous RFCC pilot run was on-stream for 24 hours and exhibited a stable and smooth operation. Inspection of spent catalysts indicated that, surprisingly, no catalyst particle agglomeration occurred. As shown in Table 2, the RFCC product yields were in-line with those obtained from the oilsands derived a low yield deasphalted oil [Yui et al., OGJ., Jan. 19, 1988]. In the commercial FCC operation, the coke by-product is combusted in the FCC catalyst regenerator and provided the heat for the FCC process.

This illustrates that surprisingly, poor-quality heavy crude derived residuum, with relatively high asphaltenes content, can be processed using a conventional packed bed resid hydroprocessing unit and RFCC units.

TABLE 3

Properties of S403, S409 and S411-415

| | S403 | S409 | | |
|---|---|---|---|---|
| Yield, wt % Gas | | 2.66 | S411 |
| LPG (C$_3$-C$_4$) | | 17.02 | S411 |
| Gasoilne | | 41.85 | S412 |
| Diesel | | 18.79 | S413 |
| Slurry oil | | 9.94 | S414 |
| Coke | | 9.48 | S415 |
| Density @20° C., g/cm3 | 0.9976 | 0.9342 | | |
| Nickel, ppm | 56.00 | 14.90 | | |
| Vanadium, ppm | 222.00 | 38.50 | | |
| Concarbon residue (CCR), wt % | 13.48 | 8.45 | | |
| Saturates, wt % | 40.20 | 52.96 | | |
| Aromatics, wt % | 41.70 | 36.00 | | |
| Resins, wt % | 16.80 | 10.10 | | |
| Asphaltenes, wt % | 1.30 | 0.90 | | |

While the subject process has been described with reference to illustrative aspects and examples, the description is not intended to be construed in a limiting sense. Thus, various modifications of the illustrative aspects, as well as other aspects of the invention, will be apparent to persons skilled in the art upon reference to this description. It is therefore contemplated that the appended claims will cover any such modifications or aspects. Further, all of the claims are hereby incorporated by reference into the description of the preferred aspects.

The invention claimed is:

1. A process of treating a heavy hydrocarbon-comprising material, comprising:
contacting a feed material with at least a catalyst material within a contacting zone to effect generation of a total product such that a contacting zone material is disposed within the contacting zone and consists of the catalyst material and a feed/product-comprising mixture comprising the feed material and the total product, wherein the feed/product-comprising mixture includes a Conradson carbon residue content of at least 12 weight percent, based on the total weight of the feed/product-comprising mixture, and also includes an asphaltene content of less than two weight percent, based on the total weight of the feed/product-comprising mixture, and wherein the feed material includes deasphalted heavy hydrocarbon-comprising material, and wherein the catalyst material in the contacting zone is in the form of a packed bed.

2. The process as claimed in claim 1, comprising at least one of the following (a) to (c) characteristics:
(a) the Conradson carbon residue content is less than 18 weight percent, based on the total weight of the feed/product-comprising mixture;
(b) the reaction retention time of feed/product-comprising mixture to the catalyst material within the contacting zone is at least 10 minutes;
(c) the feed/product-comprising mixture includes a total metals content of at least 100 unit weight parts per million unit weight parts of feed/product-comprising mixture.

3. A process of treating a heavy hydrocarbon-comprising material, comprising:
contacting a feed material with at least a catalyst material within a contacting zone to effect generation of a total product such that a contacting zone material is disposed within the contacting zone and consists of the catalyst material and a feed comprising deasphalted heavy hydrocarbon-comprising material from deasphalting a heavy hydrocarbon-comprising material, wherein the feed includes a Conradson carbon residue content of at least 12 weight percent, based on the total weight of the feed, and also includes an asphaltene content of less than two weight percent, based on the total weight of the feed, and wherein the catalyst material in the contacting zone is in the form of a packed bed.

4. The process as claimed in claim 3, comprising at east one of the following (a) to (c) characteristics:
(a) the Conradson carbon residue content is less than 18 weight percent, based on the total weight of the feed;
(b) the reaction retention time of feed to the catalyst materiel within the contacting zone is at least 10 minutes;
(c) the feed includes a total metals content of at least 100 unit weight parts per million unit weight parts of feed.

5. The process as claimed in claim 1, wherein the catalyst material includes particulate material.

6. The process as claimed in claim 1, wherein the catalyst material has a pore size of 10 to 30 nanometers, a total pore volume of 0.8 to 2-milliliters per gram, and specific surface area of 150 to 400 square meters per gram.

7. The process as claimed in claim 1, wherein the feed material further includes a hydrogen donor.

8. The process as claimed in claim 7, wherein the hydrogen donor includes molecular hydrogen.

9. The process as claimed in claim 1, wherein the contacting effects hydroprocessing of at least a fraction of hydrocarbon material of the feed material.

10. The process as claimed in claim 1, wherein the contacting is effected while the feed/product-comprising mixture is being flowed through the contacting zone in response to a driving force.

11. The process as claimed in claim 1, wherein the deasphalted heavy hydrocarbon-comprising material includes a Conradson carbon residue content of at least 12 weight percent, based on the total weight of the deasphalted heavy hydrocarbon-comprising material, and also includes an asphaltene content of less than two (2) weight percent, based on the total weight of the deasphalted heavy hydrocarbon-comprising material.

12. The process as claimed in claim 1, wherein the heavy hydrocarbon-comprising material includes a Conradson carbon residue content of at least 12 weight percent, based on the total weight of the heavy hydrocarbon-comprising mixture, and also includes an asphaltene content of less than 40 weight percent, based on the total weight of the heavy hydrocarbon-comprising mixture.

13. The process as claimed in claim 1, further comprising deasphalting a heavy hydrocarbon-comprising material to generate the deasphalted heavy hydrocarbon-comprising material.

14. The process as claimed in claim 3, wherein the catalyst material includes particulate material.

15. The process as claimed in claim 3, wherein the catalyst material has a pore size of 10 to 30 nanometers, a total pore volume of 0.8 to 2 milliliters per gram, and specific surface area of 150 to 400 square meters per gram.

16. The process as claimed in claim 3, wherein the feed material further includes a hydrogen donor.

17. The process as claimed in claim 16, wherein the hydrogen donor includes molecular hydrogen.

18. The process as claimed in claim 3, wherein the contacting effects hydroprocessing of at least a fraction of hydrocarbon material of the feed material.

19. The process as claimed in claim 3, wherein the contacting is effected while the feed is being flowed through the contacting zone in response to a driving force.

20. The process as claimed in claim 3, further comprising deasphalting a heavy hydrocarbon-comprising material to generate the deasphalted heavy hydrocarbon-comprising material.

* * * * *